United States Patent [19]

Martens

[11] Patent Number: 4,864,396
[45] Date of Patent: Sep. 5, 1989

[54] TELEVISION TRANSMISSION SYSTEM INCLUDING A PYRAMIDAL CODING/DECODING CIRCUIT

[75] Inventor: Jean B. O. S. Martens, Eindhoven, Netherlands

[73] Assignee: U.S. Philips Corporation, New York, N.Y.

[21] Appl. No.: 192,027

[22] Filed: May 9, 1988

[30] Foreign Application Priority Data

May 27, 1987 [NL] Netherlands ............... 8701261

[51] Int. Cl.$^4$ .............................................. H04N 7/12
[52] U.S. Cl. ..................................... 358/133; 358/135
[58] Field of Search ............... 358/133, 135, 141, 17; 382/56

[56] References Cited

U.S. PATENT DOCUMENTS

| 4,268,861 | 5/1981 | Schreiber et al. | 358/138 |
|---|---|---|---|
| 4,523,230 | 6/1985 | Carlson et al. | 358/167 |
| 4,709,394 | 11/1987 | Bessler et al. | 358/133 X |
| 4,718,104 | 1/1988 | Anderson | 358/133 X |
| 4,734,767 | 3/1988 | Kaneko et al. | 358/133 |

FOREIGN PATENT DOCUMENTS 2143046  1/1985  United Kingdom .

OTHER PUBLICATIONS

"The Laplacian Pyramid as a Compact Image Code"; Bart et al.; IEEE Transactions, vol. COM-31, #4; Apr. '83 ; pp. 532-540.
"Second-Generation Image-Coding Techniques", Kunt et al.; IEEE Proceedings, vol. 73, #4; Apr. '85; pp. 549-573.
"Image Restoration: A Regularization Approach", Karayiannis et al.; Second International Conference on Image Processing; Jun. '86.
"Anisotropic Nonstationary Image Estimation and Its Applications"; Knutsson et al., IEEE, vol. COM-31, #3; Mar. '83; pp. 388-397.

Primary Examiner—James J. Goody
Assistant Examiner—Victor R. Kostak
Attorney, Agent, or Firm—Michael E. Marion

[57] ABSTRACT

A pyramidal coding circuit comprises a decimation circuit (14.1) which receives the picture consisting of $M \times N$ pixels to be transmitted and converts it into $K+1$ auxiliary pictures $B_k$, the numbers of horizontal and vertical pixels of $B_k$ being smaller by respective factors $A_H$ and $A_V$ than those of the auxiliary picture $B_{k-1}$ ($k=0, 1, 2, \ldots K$) preceding in ordinal number. Each auxiliary picture $B_k$ is expanded in an expansion channel 14.4(.) to an expanded auxiliary picture $B'_k$ having the same number of horizontal and vertical pixels as the auxiliary picture $B_{k-1}$. In a difference picture former 14.7 (.) the auxiliary picture $B_{k-1}$ and the expanded auxiliary picture $B'_k$ having the same number of horizontal and vertical pixels as $B_{k-1}$ are subtracted from each other for generating a difference picture $D_{k-1}$. The expansion channel has not only a two-dimensional interpolating low-pass filtering function 14.5(.) but also a picture prediction function 14.6(.).

4 Claims, 5 Drawing Sheets

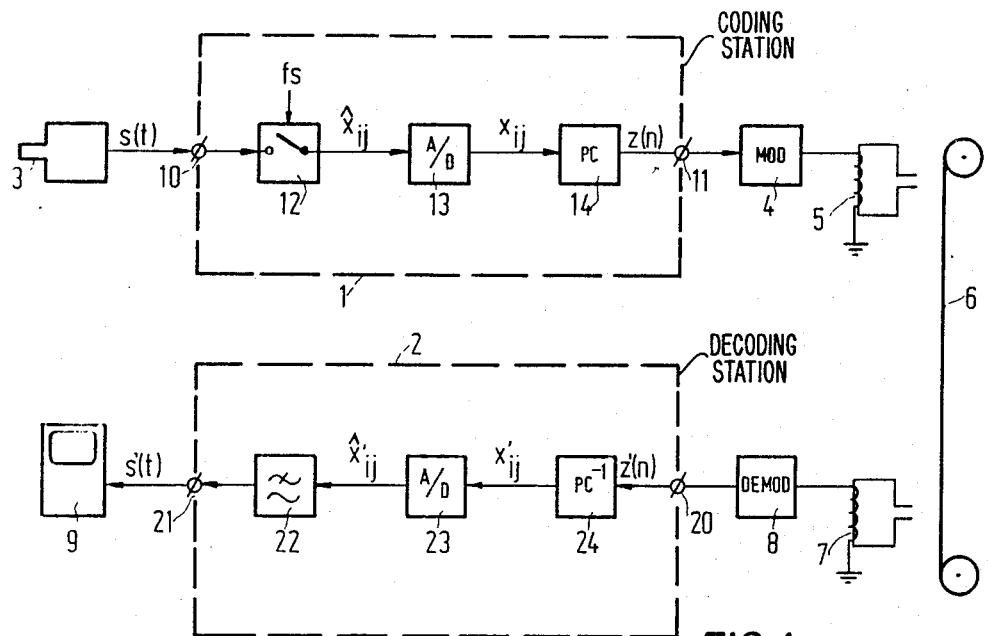
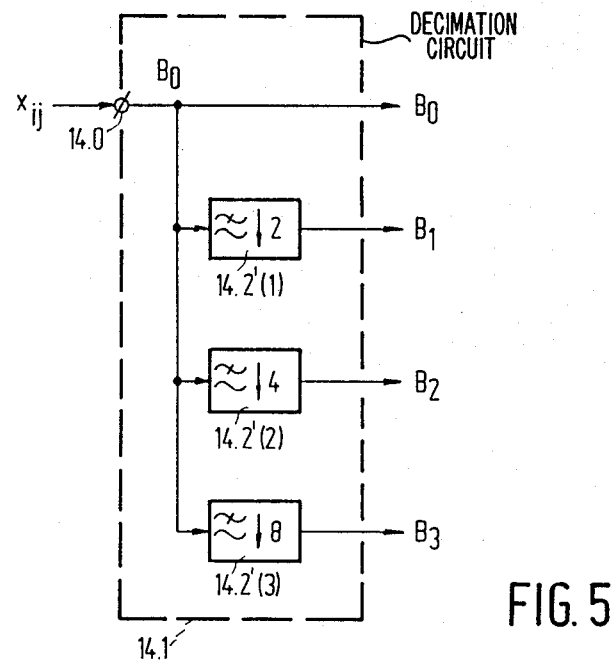
FIG. 1
FIG. 5

TELEVISION TRANSMISSION SYSTEM INCLUDING A PYRAMIDAL CODING/DECODING CIRCUIT

BACKGROUND OF THE INVENTION (1) Field of the invention

The invention generally relates to a television transmission system for the transmission of digitized images for a coding station to a decoding station via a transmission medium.

More particularly the invention relates to a television transmission system whose coding station is provided with a pyramidal coding circuit (also referred to as scale space or sub-band coder) and the decoding station is provided with a pyramidal decoding circuit (scale space or sub-band decoder).

A television system of this type may form part of a television broadcasting system, in which case the coding station forms part of the television broadcasting transmitter and each TV receiver is provided with a decoding station. The transmission medium is the atmosphere in this case.

Such a system may also form part of a video recorder or other data storage and reproducing system in which case a video tape or another storage medium (for example, a video disc) constitutes the transmission medium.

(2) Description of the prior art

As is generally known, a digital picture may be considered as an array of $M \times N$ pixels which are each represented by a given number of (for example b) bits. Thus, a total number of $M \times N \times b$ bits is required for the representation of a picture. For example, an array of $576 \times 536$ pixels and 8 bits per pixel requires approximately $2.5 \times 10^6$ bits for its representation, which is generally an inadmissibly high number. If the pixels of this array are coded independently of each other, such an array is referred to as the canonical form of the digital picture, or the canonical picture for short. The object of the coding station is to convert this canonical picture into a non-canonical picture which can be represented with considerably fewer bits than the canonical picture. The object of the decoding station is to reconstruct an accurate duplicate of the original picture from the received non-canonical picture.

Different methods are known for this conversion, such as Differential Pulse Code Modulation (DPCM) Transform Coding (TC), etc. The following description will be based on a recently proposed method which will be referred to as Pyramidal Coding and which has extensively been described in, for example, References 1, 2 and 3, but whose characteristic features will herein be described in greater detail for a good understanding of this coding method.

A television transmission system using pyramidal coding comprises a pyramidal coding circuit and a pyramidal decoding circuit. The pyramidal coding circuit is provided with a decimation circuit. It receives the canonical $M \times N$ picture and supplies $K+1$ auxiliary pictures $B_o, B_1, \ldots B_K$ in which the numbers of horizontal and vertical pixels of the auxiliary picture $B_k$ are smaller by factors $A_H$ and $A_v$ than those of the auxiliary picture $B_{k-1}$; $(k=0, 1, 2, \ldots K)$.

The coding circuit further comprises a picture expansion circuit which is provided with a plurality of expansion channels each receiving a different auxiliary picture $B_k$. Each expansion channel is adapted to perform a two-dimensional interpolating low-pass filtering function for converting the auxiliary picture $B_k$ applied thereto into an expanded auxiliary picture $B'_k$ whose number of horizontal and vertical pixels is equal to that of $B_{k+1}$. The auxiliary pictures $B_k$ as well as the expanded auxiliary pictures $B'_k$ are subsequently applied to a circuit forming a difference picture. This circuit supplies difference pictures $D_k$. Such a difference picture $D_k$ is obtained by subtracting the expanded picture $B'_{k+1}$ from the auxiliary picture $B_k$.

These difference pictures $D_k$ are then transmitted to the pyramidal decoding circuit which is adapted to supply a duplicate of the picture $B_o$ representing the original picture. This pyramidal decoding circuit comprises a cascade arrangement of a plurality of local expansion channels with a circuit forming a sum picture being incorporated each tiem between two successive local expansion channels, said circuits forming a sum picture receiving different difference pictures $D_k$. Like the expansion channels in the pyramidal coding circuit, each local expansion channel is also adapted to perform a two-dimensional interpolating low-pass filtering function.

Such a local expansion channel receives the auxiliary picture $B_k$, expands it to an expanded auxiliary picture $B'_k$ whose numbers of horizontal and vertical pixels is equal to those of the difference picture $D_{k-1}$. In a circuit forming a sum picture this difference picture $D_{k-1}$ and this expanded auxiliary picture $B'_k$ are added together. Consequently the auxiliary picture $B_{k-1}$ is obtained again. This auxiliary picture $B_{k-1}$ is in turn expanded again and the expanded form is added to $D_{k-2}$ so that the auxiliary picture $B_{k-2}$ is obtained, etc. This operation is continued until the original picture $B_o$ is obtained again.

The dynamic range of the difference pictures $D_0$ to $D_K$ will generally be much smaller than that of the auxiliary pictures. As a result, considerable fewer bits will be necessary for their coding than for the individual auxiliary pictures. It is even possible to further decrease the number of pixels of a difference picture to be transmitted. All these measures ensure that the total number of bits required to represent a complete picture is considerably lower than for the canonical picture.

OBJECT AND SUMMARY OF THE INVENTION

It is an object of the invention to provide a television transmission system including a pyramidal coding circuit and decoding circuit with which the total number of bits required to represent a complete picture can be still further decreased.

According to the invention a plurality of expansion channels in the pyramidal coding circuit and the local expansion channels in the pyramidal decoding circuit corresponding thereto have not only a two-dimensional interpolating low-pass filtering function but also a picture prediction function.

The Applicant has found that ascribing an additional picture prediction function to the expansion channel gives this channel such a transfer function that a considerable decrease is realised in the dynamic range of the difference pictures, which in itself directly leads to a decrease of the bit rate.

A class of transfer functions suitable for this purpose is known as restoration or regularisation functions. This class of transfer function is extensively described in Reference 5.

Another class of transfer functions suitable for this purpose is described in section IV B of Reference 4 and in Reference 6.

In practice such an expansion channel can be implemented in different ways. For example, it can be implemented as a cascade arrangement of a two-dimensional interpolating low-pass filter and a suitably dimensioned two-dimensional picture prediction filter. In practical uses it will generally be preferred to combine both filters to a common filter.

REFERENCES

1. The Laplacian Pyramid as a Compact Image Code; P. J. Burt, E. H. Adelson; IEEE Transactions on Communications, Vol. COM-31, No. 4, Apr. 1983, pages 532–540.
2. Real Time Hierarchical Signal Processing Apparatus; C. R. Carlson et al. U.K. Patent Application GB 2 143 046 A.
3. System for Coring an Image-Representing Signal; C. R. Carlson et all; US Patent 4 523 230.
4. Second-Generation Image-Coding Techniques; M. Kunt, A. Ikonomopoulos, M. Kocher; Proceedings of the IEEE, Vol.73, No. 4, Apr. 1985 pages 549–573.
5. Image Restoration: A Regularization Approach; N. B. Karayiannis, A. N. Venetsanopoulos; Second International Conference on Image Processing and its Applications; 24–26 June 1986; Conference Publication Number 265, pages 1–5.
6. Anisotropic Nonstationary Image Estimation and its Applications; Part I—Restoration of Noisy Images; H. E. Knutsson, R. Wilson, G. H. Granlund; IEEE Transactions on Communications, Vol. COM-31, No. 3, Mar. 1983, pages 388–397.

BRIEF DESCRIPTION OF THE FIGURES

FIG. 1 shows diagrammatically a video recorder provided with a television transmission system according to the invention;

FIG. 5 shows a further embodiment of the decimation circuit used in the pyramidal coding circuit.

Figure 2:
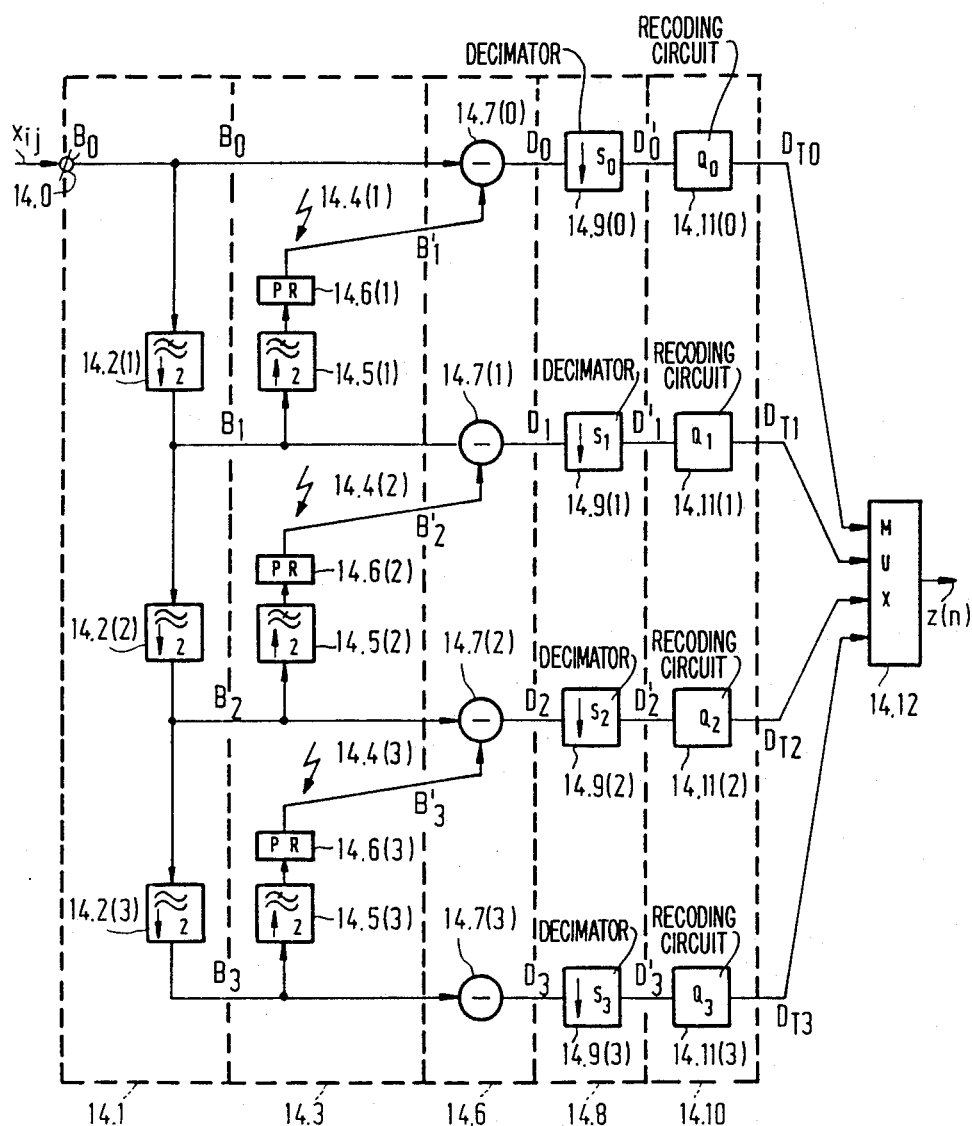
FIG. 2 shows an embodiment of a pyramidal coding circuit.

EXPLANATION OF THE INVENTION (1) General structure of a TV transmission system.

FIG. 1 shows diagrammatically a video recorder provided with the TV transmission system according to the invention. This transmission system comprises a coding station 1 and a decoding station 2. The coding station has an input 10 for receiving analog picture signals s(t) which are supplied by a picture signal source 3, for example, a video camera. This coding station supplies series of transmission words z(n) from its output 11 for each picture to be transmitted. These words are registered on a magnetic tape 6 via a cascade arrangement of a modulator circuit 4 and write head 5.

The information present on the magnetic tape 6 is converted by means of a cascade arrangement of a read head 7 and a demodulator circuit 8 into series of transmission words z'(n) which in the absence of transmission errors accurately correspond to the transmission words z(n) applied to the modulator circuit 4. These series of transmission words z'(n) are applied to an input 20 of the decoding station 2. This station supplies from its output 21 a duplicate signal s'(t) which corresponds to the picture signal s(t) supplied by the video signal source 3. This duplicate signal is applied to a monitor 9 for the purpose of display.

In the coding station 1 the analog picture signal s(t) is sampled in a sampling circuit 12 having a suitably chosen sampling frequency $f_s$ of approximately 10 MHz. Consequently each picture line is converted into a series of video signal samples, also referred to as pixels. The i-th pixel of the j-th line of the picture will hereinafter be denoted by $\hat{x}_{ij}$. Each pixel thus obtained is converted in an analog-to-digital converter 13 into, for example, an eight-bit PCM word $x_{ij}$. If it is assumed that $i = 1, 2, 3, \ldots, M$ and $j = 1, 2, 3, \ldots, N$, a complete picture can be considered as an array of $M \times N$ pixels $x_{ij}$. As already noted, this matrix is more particularly referred to as the canonical form of the picture.

The pixels of the canonical picture thus obtained are applied to a pyramidal coding circuit 14 whose structure will be described hereinafter. In this respect it is only to be noted that it is adapted to convert each canonical picture into the series of transmission words z(n) which comprises considerably fewer bits than the array of $M \times N$ pixels $x_{ij}$.

In the decoding station 2 each received series of transmission words z'(n) is applied to a pyramidal decoding circuit 24, whose structure will also be described hereinafter. In this respect it is only to be noted that it converts a series of transmission words z'(n) into an $M \times N$ array of pixels $x'_{ij}$. Each pixel is converted in a digital-to-analog converter 23 into a video signal sample $\hat{x}'_{ij}$. These video signal samples are subjected to a low-pass filtering operation in a low-pass filter 22 so that the duplicate signal s'(t) is obtained.

The pyramidal coding and decoding circuits.

Figure 4:
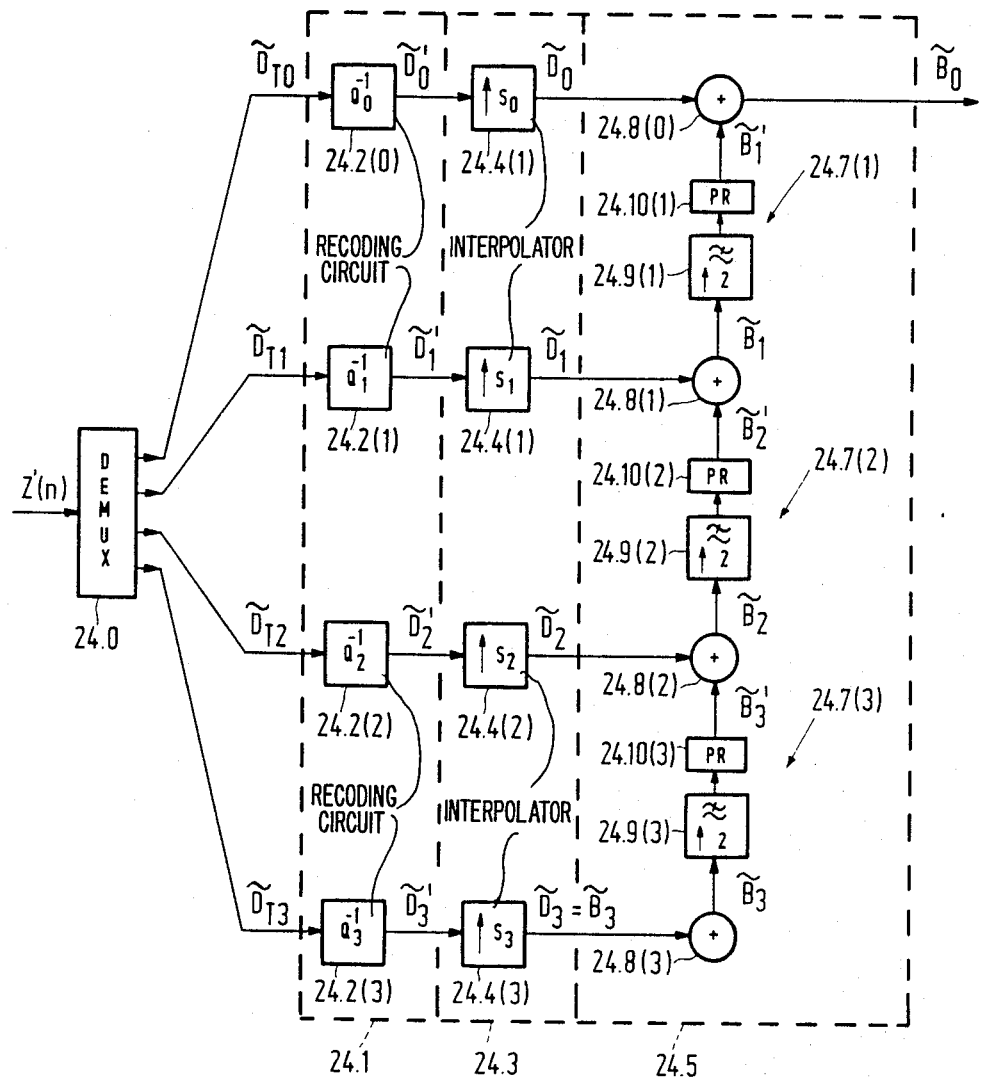
FIG. 4 shows an embodiment of a pyramidal decoding circuit.

The general structure of the pyramidal coding circuit is shown in FIG. 2 and that of the pyramidal decoding circuit is shown in FIG. 4.

The pyramidal coding circuit shown in FIG. 2 receives at its input 14.0 the pixels $x_{ij}$ of the canonical picture $B_o$. This picture is applied to a decimation circuit 14.1 which in this embodiment consists of a cascade arrangement of three two-dimensional decimating low-pass filters 14.2(.). These filters have a horizontal decimation factor $A_H$ and a vertical decimation factor $A_V$. In this embodiment it has been assumed that $A_H = A_V = 2$. This decimation circuit supplies four auxiliary pictures $B_0$, $B_1$, $B_2$ and $B_3$. More particularly the auxiliary picture $B_0$ is identical to the canonical picture $B_o$ and consists of an array of $M \times N$ pixels. The auxiliary picture $B_1$ is supplied by the filter 14.2(1) and consists of an array of $(M/2) \times (N/2)$ pixels. The auxiliary picture $B_2$ is supplied by the filter 14.2(2) and consists of an array of $(M/4) \times (N/4)$ pixels. Finally, the auxiliary picture $B_3$ is supplied by the filter 14.2(3) and consists of an array of $(M/8) \times (N/8)$ pixels.

The auxiliary pictures thus obtained are applied to an expansion circuit 14.3 which is constituted by three expansion channels 14.4(.) receiving the respective auxiliary pictures $B_1$, $B_2$, $B_3$. Each expansion channel comprises a two-dimensional interpolating low-pass filter 14.5(.) with a two-dimensional prediction filter 14.6(.)

arranged in cascade therewith. The interpolating filters have a horizontal interpolation factor which is equal to the horizontal decimation factor $A_H$ of the decimation filters and a vertical interpolation factor which is equal to the vertical decimation factor $A_V$ of the decimating filters. The expansion channels 14.4(.) supply the respective expanded auxiliary pictures B'$_1$, B'$_2$ and B'$_3$. More particularly the expanded auxiliary picture B'$_1$ consists of an array of M×N pixels, the expanded auxiliary picture B'$_2$ consists of an array of (M/2)×(N/2) pixels and the expanded auxiliary picture B'$_3$ consists of an array of (M/4)×(N/4) pixels.

The auxiliary pictures B$_0$, B$_1$, B$_2$, B$_3$ and the expanded auxiliary pictures B'$_1$, B'$_2$, B'$_3$ are applied to a circuit 14.6 forming a difference picture comprising four difference picture formers 14.7(.). Difference picture former 14.7(0) receives the pictures B$_0$ and B'$_1$ and supplies a difference picture D$_0$ consisting of M×N difference pixels. Difference picture former 14.7(1) receives the pictures B$_1$ and B'$_2$ and supplies a difference picture D$_1$ consisting of (M/2)×(N/2) difference pixels. Difference picture former 14.7(2) receives the pictures B$_2$ and B'$_3$ and supplies a difference picture D$_2$ consisting of (M/4)×(N/4) difference pixels. In addition to these difference pictures D$_0$, D$_1$, D$_2$, the circuit 14.6 forming the difference pictures supplies a difference picture D$_3$ which is, however, identical to the auxiliary picture B$_3$.

Bit rate reduction is obtained by the fact that the dimensions of the difference pictures D$_0$, D$_1$, D$_2$, D$_3$ can be further reduced, for example, by a factor of S$_0$, S$_1$, S$_2$, S$_3$, respectively, in both the horizontal and the vertical direction. This operation can be realised by using a further decimation circuit 14.8 comprising four decimators 14.9(.) each receiving a different difference picture. This decimation circuit 14.8 supplies four modified difference pictures D'$_0$, D'$_1$, D'$_2$, D'$_3$.

Since the dynamic range of the difference pixels will be smaller than those of the original pixels, a further reduction of the bit rate can be obtained by recoding, preferably non-linearly, of the difference pixels. To this end the modified difference pictures are applied to a recoding circuit 14.10 which in this embodiment comprises four recoding circuits 14.11(.). Each recoding circuit receives a differently modified difference picture and supplies the transmission pictures D$_{T0}$, D$_{T1}$, D$_{T2}$, D$_{T3}$ which are applied to a multiplexer circuit 14.12. and which supplies the series of transmission words z(n). More particularly z(n) is obtained because the multiplexer circuit 14.12 each time first arranges the pixels of D$_{T3}$ in series for each canonical picture, then those of D$_{T2}$, subsequently those of D$_{T1}$ and finally those of D$_{T0}$.

In the interpolating filter 14.5(k) an operation is performed on the auxiliary picture B$_k$ applied thereto, which operation is inverse to the operation performed by the corresponding decimating filter 14.2(k) on the auxiliary picture B$_{k-1}$ applied thereto (see also Reference 1). The dynamic range of the difference pixels in the difference picture D$_k$ and hence the number of bits which must be allocated to each difference pixel is mainly determined by the variations in brightness at transitions in the picture (edges).

By using the additional prediction factor 14.6(k) the expansion channel 14.4(k) can be given such a transfer function that an interesting bit rate reduction is realised. The transfer function can in fact be chosen to be such that the dynamic range of the difference pixels is considerably reduced.

As already stated, a class of transfer functions suitable for this purpose is known under the name of restoration or regularisation function. This class of transfer functions is extensively described in, for example, Reference 5.

Another class of transfer functions suitable for this purpose is described in section IV B of Reference 4. In this case stationary and non-stationary parts of the picture are separately subjected to an operation.

For the sake of completeness an example will be given of a transfer function associated with the class described in Reference 5. To this end the transfer function of the two-dimensional decimating filter 14.2(k) will be denoted by $A_o(\omega_x, \omega_y)$ and the transfer function of the expansion channel will be denoted by $H_0(\omega_x, \omega_y)$. In accordance with Reference 5 it holds that $$H_o(\omega_x,\omega_y) = \frac{A_o(\omega_x,\omega_y)}{A_o^2(\omega_x,\omega_y) + pR(\omega_x,\omega_y)} \quad (1)$$

In this expression the polynome $R(\omega_x, \omega_y)$ is dependent on the spectrum of the original picture. It appears for may pictures that $$R(\omega_x, \omega_y) = (q^2 \omega_x \omega_y)^2 \quad (2)$$

is a good choice. In (2) q is a parameter to be freely chosen which is related to the sampling period of the canonical picture. The parameter p in (1) is also a parameter to be chosen freely. Its choice will, however, be considerably influenced by the admissible amplification of noise.

For a practical realisation of a two-dimensional filter it is generally advantageous if its transfer function can be separated into functions for each individual dimension. If in the relevant case it is also assumed that the transfer function of the expansion channel can be separated in this sense as a good approximation, then it holds that $$(3) \quad H_0(\omega_x, \omega_y) = H(\omega_x).H(\omega_y)$$

Correspondingly it will be assumed that $$(4) \quad A_0(\omega_x, \omega_y) = A(\omega_x).A(\omega_y)$$

For the transfer function $H(\omega)$ it will generally hold that $$H(\omega) = \frac{A(\omega)}{A^2(\phi) + p(q\omega)^4} \quad (5)$$

A very favourable transfer function for $A(\omega)$ appears to be the Gaussian function $G(\omega)$ in practice, which is defined as follows $$A(\omega) = G(\omega) = \exp[-(q\omega)^2/2] \quad (6)$$

$H(\omega)$ changes into $$H(\omega) = \frac{\exp[-(q\omega)^2/2]}{\exp[-(q\omega)^2] + p(q\omega)^4} \quad (7)$$

By normalising the variable $\omega$ in this expression (7) in accordance with $$\omega = \Omega f_s \quad (8)$$

(7) changes into $$H(\Omega) = \frac{\exp[-(r\Omega)^2/2]}{\exp[-(r\Omega)^2] + p(r\Omega)^4} \quad (9)$$

Figure 3:
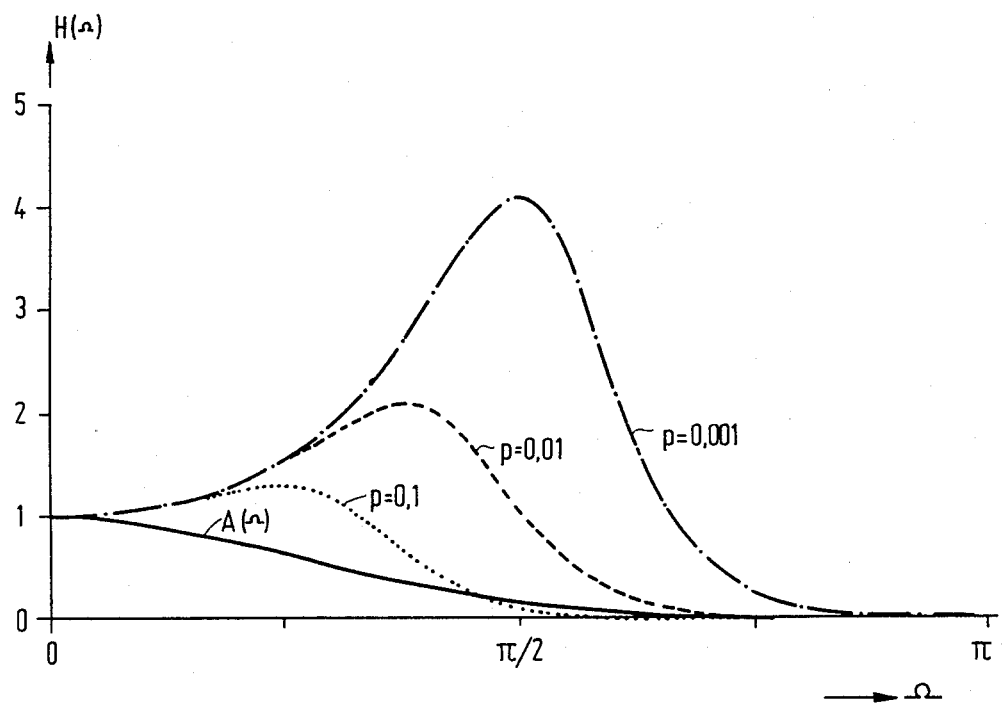
FIG. 3 shows some transfer functions for the expansion channels of the pyramidal coding and decoding circuits.

FIG. 3 shows the associated transfer characteristics for some values of p. It is to be noted that the constant $r=0.7\sqrt{3}$ is chosen and the decimation factors $A_H$ and $A_V$ are equal to two.

For recovering a duplicate of the canonical picture $B_O$ the received transmission words $z'(n)$ are applied in the pyramidal decoding circuit of FIG. 4 to a demultiplexer circuit 24.0 supplying local transmission pictures $\tilde{D}_{Tk}$ from separate outputs. These pictures are applied to a local recording circuit 24.1 comprising the four local recording circuits 24.2(.). In these local recoding circuits 24.2(.) an operation is performed on the pixels of the local transmission pictures, which operation is inverse to the operation performed by each recoding circuit 14.11(.) in the pyramidal coding circuit. These local recoding circuits 24.2(1) thus supply local modified difference pictures $\tilde{D}'_k$. These are in turn applied to an interpolation circuit 24.3 comprising four interpolators 24.4(.) each having a horizontal and a vertical interpolation factor S and supplying a local difference picture $\tilde{D}_k$. These local difference pictures are applied to a local picture expansion circuit 24.5 comprising a plurality of local sum picture formers 24.8(k). Each of these receives a local difference picture $\tilde{D}_k$ and an expanded local auxiliary picture $\tilde{B}'_k$ and supplies a local auxiliary picture $\tilde{B}_k$ in which the numbers of horizontal and vertical pixels are equal to those of the local difference picture $\tilde{D}_k$ and larger by respective factors $A_H$ and $A_V$ than those of the local auxiliary picture $\tilde{B}_{k+1}$. Two sum picture formers succeeding each other in ordinal number are each time coupled together by means of a local expansion channel 24.7(k). This channel receives the local auxiliary picture $\tilde{B}_k$ from the sum picture former 24.8(k) and applies the expanded local auxiliary picture $\tilde{B}_k$ to the next sum picture former 24.8(k). This local expansion channel, like the corresponding expansion channel in the pyramidal coding circuit (see FIG. 2), is adapted to perform a two-dimensional interpolating low-pass filtering function and a two-dimensional picture prediction function. In the embodiment shown the expansion channel 24.7(.) is therefore provided with a local two-dimensional interpolating low-pass filter 24.9(.) and a local two-dimensional picture prediction circuit 24.10(.). It is to be noted that a local expansion channel corresponds to an expansion channel in the pyramidal coding circuit if the two expansion channels supply principally the same expanded auxiliary picture.

Some alternative embodiments.

In the embodiment of the pyramidal coding circuit shown in FIG. 2 the decimation circuit 14.1 is constituted by a cascade arrangement of a plurality of two-dimensional decimating low-pass filters 14.1(.) whose horizontal and vertical decimation factors are equal to each other. In addition, the horizontal decimation factors are equal to the vertical decimation factors. FIG. 5 shows a decimation circuit 14.1 which is also constituted by a plurality of two-dimensional decimating low-pass filters 14.2'(.). These filters are parallel connected to the input 14.0 and the decimation factors of the filters are now mutually unequal. Again it has been assumed that the horizontal decimation factor of a filter is equal to its vertical decimation factor.

Figure 6:
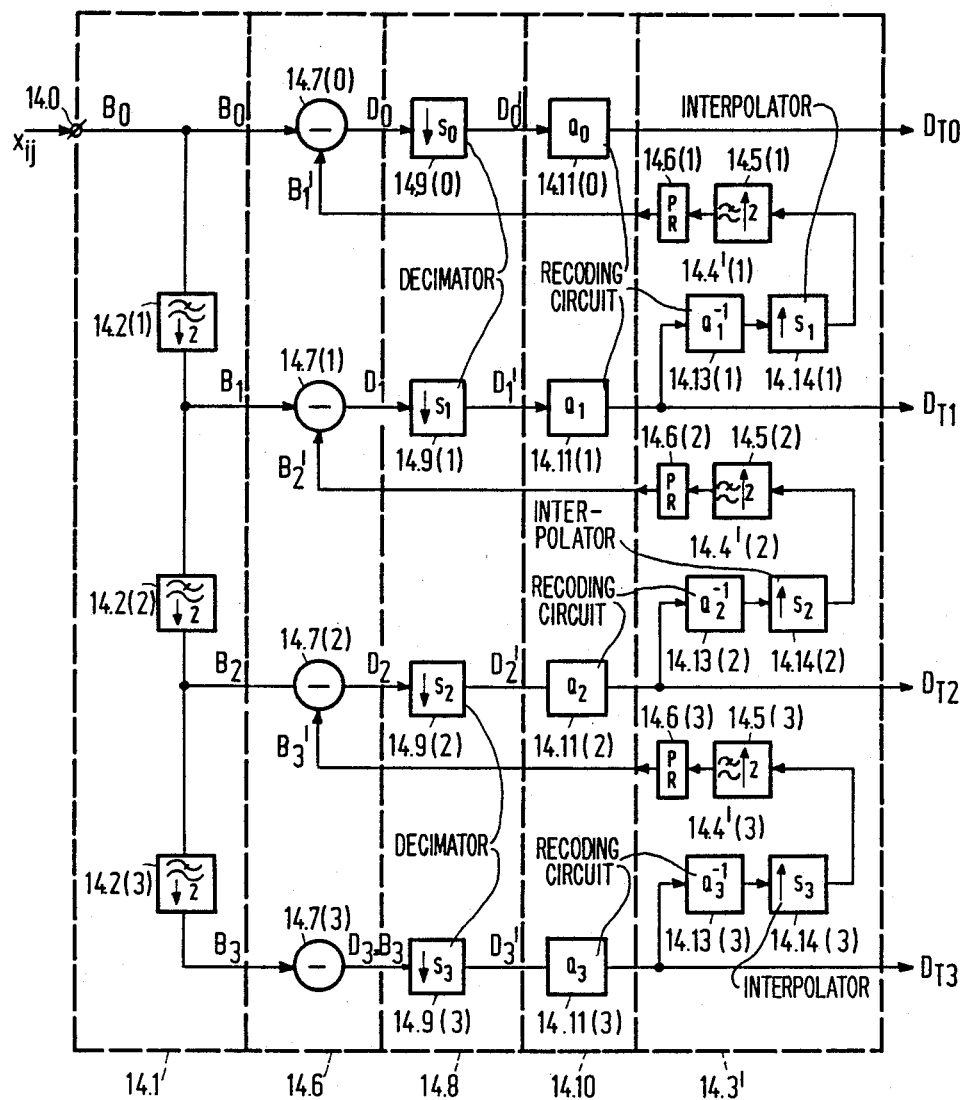
FIG. 6 shows a further embodiment of a pyramidal coding circuit.

FIG. 6 shows a further embodiment of the pyramidal coding circuit shown in FIG. 2. It differs from the circuit shown in this latter Figure in that the expansion channel 14.4'(k) receives the transmission picture $D_{Tk}$ for generating the expanded auxiliary picture $B'_k$ and this expansion channel further comprises a local recoding circuit 14.13(k) and an interpolator 14.14(k). In the recoding circuit 14.13(k) an operation is performed on the pixels of the transmission picture $D_{Tk}$, which operation is inverse to the operation performed by the recoding circuit 14.11(k) on the pixels of the modified difference picture $D'_k$.

The interpolator 14.14(k) has an interpolation factor $S_k$ (both horizontally and vertically) and compensates for the operation of the decimator 14.9(k).

In the embodiments shown in FIGS. 2, 4 and 6 each expansion channel has a picture prediction function. It appears in practice that those expansion channels receiving the auxiliary pictures of the smallest dimensions (for example 14.4(3)) need not have such a function because it yields a hardly noticeable improvement of the picture quality.

What is claimed is:

1. A television transmission system for the transmission of a picture consisting of M×N pixels from a coding station (1) to a decoding station (2), the coding station comprising a pyramidal coding circuit provided with:

a decimation circuit receiving the picture to be transmitted and converting it into K+1 auxiliary pictures $B_k$ to $B_K$ (where k=0, 1, 2, ... K), the numbers of horizontal and vertical pixels of the auxiliary picture $B_k$ being smaller by respective factors $A_H$ and $A_V$ and smaller than those of the auxiliary picture $B_{k-1}$ preceding in ordinal number;

a picture expansion circuit having K expansion channels each receiving a different auxiliary picture $B_k$ and each being adapted to perform a two-dimensional interpolating low-pass filtering function for increasing the numbers of horizontal and vertical pixels of the auxiliary picture $B_k$ applied thereto by the factors $A_H$ and $A_V$, respectively, for generating an expanded auxiliary picture $B'_k$;

a forming circuit for forming difference pictures $D_k$ through $D_K$ by receiving both the auxiliary pictures $B_k$ through $B_K$ and expanded auxiliary pictures $B'_k$ through $B'_K$ and subtracting the expanded auxiliary picture $B'_{k+1}$ each time from the auxiliary picture $B_k$ for generating difference pictures $D_k$ through $D_K$;

means for converting the difference pictures $D_k$ through $D_K$ into a series of n transmission words $(z(n))$; and in which the decoding station comprises a pyramidal decoding circuit provided with means for converting a series of n received transmission words $z'(n)$ into local difference pictures $\tilde{D}_k$ through $\tilde{D}_K$;

a local picture expansion circuit comprising K+1 local sum picture formers each receiving a different local difference picture $\tilde{D}_k$ via a first input, an expanded local auxiliary picture $\tilde{B}'_k$ via a second input and each supplying a local auxiliary picture $\tilde{B}_k$ from their output, the numbers of horizontal and vertical pixels of the local auxiliary picture $\tilde{B}_k$ being larger by factors $A_H$ and $A_V$ respectively than those of the local auxiliary picture $\tilde{B}_{k+1}$ succeeding in ordinal number; K local expansion channels each being coupled between the output of a sum picture former and the second input of the sum picture former preceding in ordinal number, and each being adapted for performing a two-dimensional interpolating low-pass filtering function for increasing the numbers of horizontal and vertical pixels of the local auxiliary picture $\tilde{B}_k$ applied thereto by the factors $A_H$ and $A_V$, respectively, for generating the expanded local auxiliary picture $\tilde{B}'_k$; characterized in that each of a plurality of the expansion channels in the pyramidal coding circuit and their corresponding local expansion channels in the pyramidal decoding circuit has a two-dimensional interpolating low-pass filtering function and a picture prediction function.

2. A coding station for use in a television transmission system which comprises a pyramidal coding circuit for the transmission of a picture consisting of M×N pixels and which is provided with:

a decimation circuit receiving the picture to be transmitted and converting it into K+1 auxiliary pictures $B_k$ to $B_K$ (where k=0, 1, 2, ... K), the numbers of horizontal and vertical pixels of the auxiliary picture $B_k$ smaller by respective factors $A_H$ and $A_V$ than those of the auxiliary picture $B_{k-1}$ preceding in ordinal number;

a picture expansion circuit coupled to said decimation circuit having K expansion channels each receiving a different auxiliary picture $B_k$ and each being adapted to perform a two-dimensional interpolating low-pass filtering function to increasing the numbers of horizontal and vertical pixels of the auxiliary picture $B_k$ applied thereto by the factors $A_H$ and $A_V$, respectively, for generating an expanded auxiliary picture $B'_k$;

a forming circuit coupled to said picture expansion circuit for forming difference pictures by receiving both the auxiliary pictures $B_k$ through $B_K$ and the expanded auxiliary pictures $B'_k$ and subtracting the expanded auxiliary picture $B'_{k+1}$ each time from the auxiliary picture $B_k$ for generating difference pictures $D_k$ through $D_K$;

means coupled to said forming circuit for converting the difference pictures $D_k$ through $D_K$ into series of n transmission words (z(n));

characterized in that each of a plurality of the expansion channels has a two-dimensional interpolating low-pass filtering function and a picture prediction function.

3. A decoding station for use in a television system and for receiving n transmission words (z(n)) generated by the coding station of claim 2, comprising a pyramidal decoding circuit provided with means for converting a series of n received transmission words z'(n) into local difference pictures $\tilde{D}_k$ through $\tilde{D}_K$;

a local picture expansion circuit comprising K+1 local sum picture formers each receiving a different local difference picture $\tilde{D}_k$ via a first input, an expanded local auxiliary picture $\tilde{B}'_k$ via a second input and each supplying a local auxiliary picture $\tilde{B}_k$ from their output, the numbers of horizontal and vertical pixels of the local auxiliary picture $\tilde{B}_k$ being respective factors $A_H$ and $A_V$ larger than those of the local auxiliary picture $\tilde{B}_{k+1}$ succeeding in ordinal number; K local expansion channels each being coupled between the output of a sum picture former and the second input of the sum picture former preceding in ordinal number, and each being adapted to perform a two-dimensional interpolating low-pass filtering function for increasing the numbers of horizontal and vertical pixels of the local auxiliary pictures $\tilde{B}_k$ applied thereto by the factors $A_H$ and $A_V$, respectively, for generating the expanded local auxiliary picture $\tilde{B}'_k$; characterized in that each of a plurality of the local expansion channels has a two-dimensional interpolating low-pass filtering function and a picture prediction function.

4. In a television transmission system for the transmission of a picture consisting of a plurality of pixels, said system comprising:

a pyramidal coding circuit comprising a picture expansion circuit having a plurality of expansion channels; and a decoding circuit coupled to said pyramidal coding circuit by a transmission medium, said decoding circuit comprising a plurality of local expansion channels;

characterized in that each of a number of expansion channels in said pyramidal coding circuit and respective local expansion channels in said pyramidal decoding circuit corresponding thereto, has a two dimensional interpolating low pass filtering function and a picture prediction function.

* * * * *